United States Patent [19]  [11]  4,067,622
Krambrock et al.  [45]  Jan. 10, 1978

[54] METHOD AND APPARATUS FOR THE PNEUMATIC CONVEYING OF BULK MATERIAL

[75] Inventors: Wolfgang Krambrock, Ravensburg; Dieter Heep, Bergatreute; Norbert Eberhard, Ertingen, all of Germany

[73] Assignee: Waeschle Maschinenfabrik GmbH, Ravensburg, Germany

[21] Appl. No.: 739,103

[22] Filed: Nov. 5, 1976

[30] Foreign Application Priority Data

Nov. 7, 1975 Germany .......................... 2550164

[51] Int. Cl.$^2$ ............................................. B65G 53/16
[52] U.S. Cl. ......................................................... 302/24
[58] Field of Search ........................ 302/24, 26, 29, 31, 302/35

[56] References Cited
U.S. PATENT DOCUMENTS 2,897,005  7/1959  Wiltse .................................. 302/24
3,929,379  12/1975  Krambrock .......................... 302/24

Primary Examiner—Bruce H. Stoner, Jr.
Assistant Examiner—Jeffrey V. Nase
Attorney, Agent, or Firm—Donald D. Jeffery

[57] ABSTRACT

Conveyor gas is passed through a conveyor conduit to convey bulk material therethrough, while clean gas is passed through a by-pass conduit connected to the conveyor conduit at positions spaced along the length of the conduits. The by-pass conduit can be divided into a plurality of sections by shut-off valves which close in response to a predetermined pressure difference between the two conduits, with a reduced pressure in the conveyor conduit due to a blockage of material therein. Due to the pressure difference, clean gas is transferred from the by-pass to the conveyor conduit at a plurality of said connections between the two conduits, only in the respective section in which there is the pressure difference.

6 Claims, 4 Drawing Figures

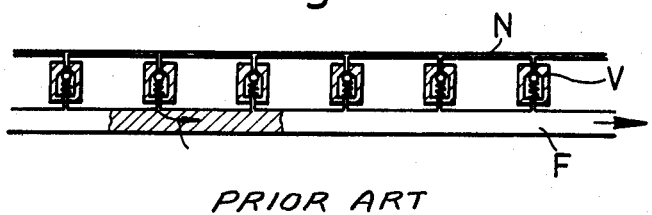
Fig.1
PRIOR ART
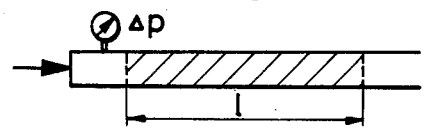
Fig.2
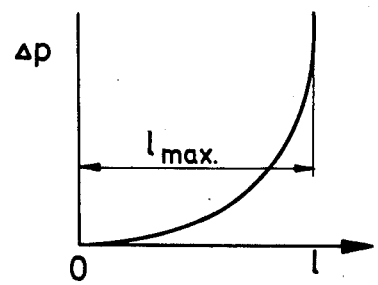
PRIOR ART

METHOD AND APPARATUS FOR THE PNEUMATIC CONVEYING OF BULK MATERIAL

BACKGROUND OF THE INVENTION

It is known that bulk material such as granular or particulate material can be conveyed through pipes or conduits by means of carrier gas such as atmospheric air. However, for reasons of economy it is desirable to maximise the amount of material conveyed for a given amount of carrier gas, as this has the advantage that small gas compressors and conduits and small separators can be used in the conveying equipment. In addition, low speeds of material and gas flow reduce wear on the walls of the conduit, while there is also less likelihood of damage to the particles of material being conveyed. However, if the speed of flow in the conduit falls below a minimum speed, material can drop out of the gas flow and become deposited in the conduit, and this can readily pile up and form a blockage which can block the conduit entirely.

It is also known that a by-pass conduit may be arranged in parallel with the conveyor conduit, the by-pass conduit being in communication with the conveyor conduit at positions spaced along the conduits so that clean gas can be injected into the conveyor conduit from the by-pass conduit, so as thereby to break up a blockage of material. A method and apparatus operating on this principle are disclosed in Krambrock U.S. Patent No. 3,929,379 issued on Dec. 30, 1975 and assigned to the assignees of the present application.

Accordingly, U.S. Pat. No. 3,929,379 discloses for the pneumatic conveying of bulk material by means of a conveyor conduit and a by-pass conduit which has communications with the conveyor conduit at a plurality of spaced positions. The pressure distribution in the bypass conduit is substantially adapted to the pressure distribution which occurs in normal trouble-free conveying operation in the conveyor conduit. When there occurs in the conveyor conduit an accumulation of material which impedes flow in the conveyor conduit, there is accordingly a pressure drop in the conveyor conduit downstream of the accumulation. Such a pressure drop causes a pressure difference in excess of a preselected threshold value between the two conduits, and the pressure difference causes the transfer of clean gas from the by-pass conduit into the conveyor conduit to loosen the accumulation of material. At the same time the flow of clean gas through the by-pass conduit is blocked at the communication position at which gas is being transferred from the by-pass conduit into the conveyor conduit. In an apparatus which is adapted for carrying out the method as outlined above, the by-pass and conveyor conduits are in communication with each other by way of a plurality of connecting means spaced along the lengths of the conduit, and non-return valves are disposed in each of said connecting means, such that the respective valve opens for the transfer of gas from the by-pass to the conveyor conduit when the pressure in the by-pass conduit is higher than the pressure in the conveyor conduit by the predetermined threshold amount. Associated with each non-return valve is a shut-off valve operable to close the by-pass conduit when the respective non-return valve is opened for the transfer of gas as aforesaid.

The basic concept of U.S. Pat. No. 3,929,279 is therefore based on the feature that the pressure difference between the by-pass conduit and the conveyor conduit, which occurs when there is a concentration or blockage of material, is utilised for operating the flow control valves thereby to divert a flow of clean gas from the by-pass conduit into the conveyor conduit and to shut off the flow of gas further along the bypass conduit. It might be said therefore that each of the flow control valves not only acts as a valve for controlling the flow of gas, but also operates as a pressure measuring member responsive to the respective pressures prevailing in the conduits. This duality of functional requirements can result in the valves necessarily being of an expensive construction, while also exhibiting a certain liability to breakdown.

SUMMARY OF THE INVENTION

An object of the present invention is a method and apparatus for the pneumatic conveying of bulk material, with simple but reliable valve operation.

A further object of the present invention is reliably to prevent a blockage occurring in a conveyor conduit for conveying bulk material by pneumatic pressure, in order thereby to prevent stagnation of the bulk material conveying procedure.

Yet another object of the present invention is to reduce the amount of gas necessary for the pneumatic conveying of bulk material.

With these and other objects in view, a method of pneumatically conveying bulk material by means of a conveyor conduit provides that a by-pass conduit for carrying clean gas is conneted to the conveyor conduit at a plurality of connecting means which are arranged at spacings from each other along the length of the conduits. The connecting means have flow control valves or flow transfer valves, operable such that when there is a pressure drop in the conveyor conduit downstream of a blockage of material in that conduit, then clean gas is transferred from the by-pass conduit by way of the appropriate connecting means. The by-pass conduit is divided into a plurality of sections along the length thereof, each section being delimited or separated from the adjacent section or sections by shut-off members which are responsive to the pressure difference between the two conduits. Each section includes a plurality of connecting means for the transfer of gas from the by-pass conduit to the conveyor conduit. When there is a blockage of material in the conveyor conduit, clean gas flows simultaneously from the by-pass conduit into the conveyor conduit, by way of all the connecting means which are disposed between the upstream end of the accumulation of material, and the shut-off member next downstream of the accumulation.

In apparatus for performing the method of the invention the length of each section can be from ten to one hundred times the diameter of the conveyor conduit, and each section defined in the by-pass conduit by adjacent shut-off members may include up to twenty flow control valves for the flow of clean gas from the by-pass conduit to the conveyor conduit.

BRIEF DESCRIPTION OF THE DRAWINGS

FIG. 1 is a diagrammatic view of a bulk material pneumatic conveying apparatus, which may be generally in accordance with Krambrock U.S. Pat. No. 3,929,379, FIG. 2 shows a diagram illustrating the displacement pressure in the conveyor conduit, in dependence on the length of an accumulation or plug of bulk material.

DESCRIPTION OF THE PREFERRED EMBODIMENT

Figure 3:
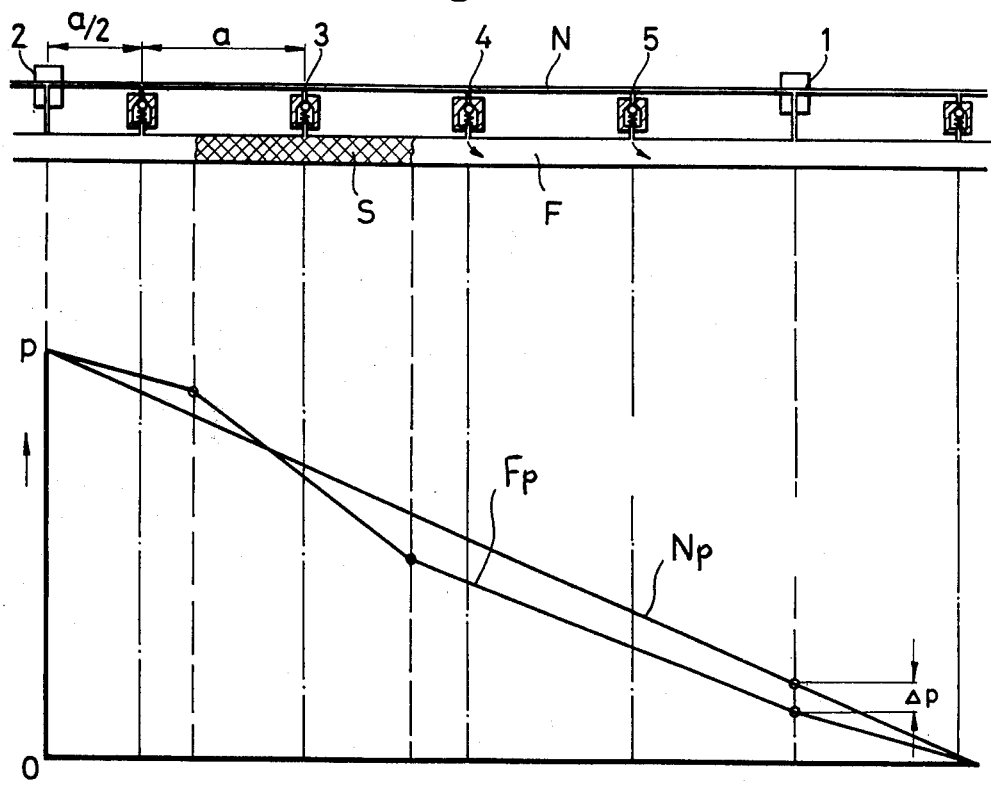
FIG. 3 shows apparatus according to the present invention, illustrating also associated pressure diagrams.
Figure 3:
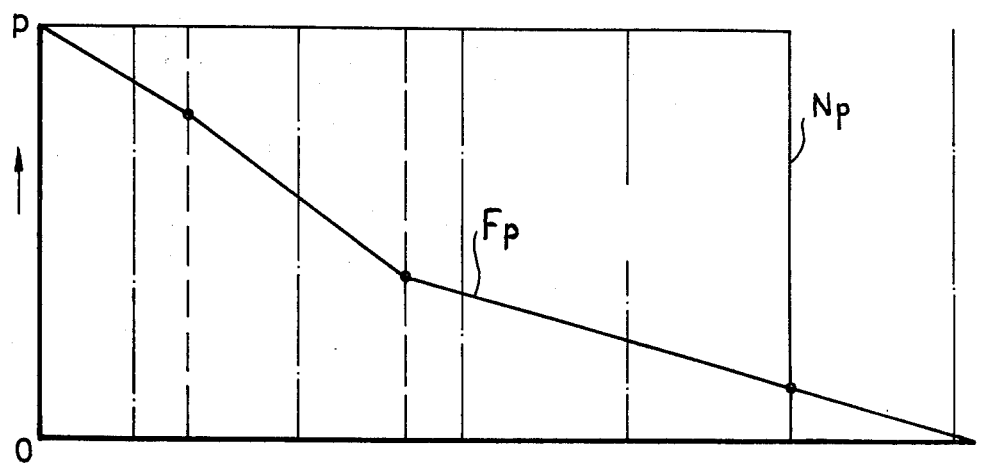

The apparatus shown in FIG. 1 has a conveyor conduit F for conveying bulk material and, parallel thereto, a by-pass conduit N which is connected to the conveyor conduit F at a plurality of positions spaced along the length of the conduits, by connecting means in the form of pipes. Each pipe includes a flow control valve or flow transfer valve shown as a non-return valve diagrammatically illustrated at V. Each of these valves V is arranged to open when the pressure in the by-pass conduit N is greater than the pressure in the conveyor conduit F by a preselected threshold amount, so that in other words each of the flow control valves not only acts as a valve for controlling the flow of gas, but also operates as a pressure measuring member responsive to the respective pressures prevailing in the conduits.

Although not shown in the drawings, the apparatus also includes suitable means such as a hopper for introducing bulk material into the conveyor conduit F, and means such as a compressor for introducing compressed gas such as compressed air into the conveyor conduit upstream of the position of introduction of the bulk material. The material-gas flow is in a direction from left to right in FIG. 1.

The by-pass conduit N is also connected to suitable means for introducing a flow of compressed gas thereinto, for example a compressor; alternatively the by-pass conduit N may be connected to the conveyor conduit F, upstream of the position at which material to be conveyed in the conduit F is introduced thereinto whereby compressed gas is tapped from the conveyor conduit F, before material is added thereto for conveying, and passed through the conduit N.

It will be seen therefore that in effect each valve V compares the pressure difference between the two conduits N and F, and, when the pressure difference exceeds a preselected threshold value with the pressure in N higher than in F, the valve V opens for air to flow from the by-pass conduit N into the conveyor conduit F.

In this apparatus the air which is being transferred from the conduit N into the conduit F is conducted into the region of an undesirably high concentration, or plug, of bulk material. The shorter the distance between the successive flow transfer valves at which such gas transfer can take place, the more quickly are blockages and accumulations of material in the conduit F broken up and thus removed.

FIG. 2 shows the necessary displacement pressure $\Delta p$ for an accumulation or plug of bulk material, illustrated over the length l of the stoppage. The pressure $\Delta p$, which can be represented by the pressure difference between the parts of the conveyor conduit upstream and downstream of the plug of material, rises exponentially with increasing length l and with a length $l_{max}$ tends to infinity. Therefore $l_{max}$ would be the theoretically maximum possible distance between two flow transfer valves in the apparatus of the above-identified U.S. Patent to Krambrock. In practice however, it has been found that it is in the rarest cases that the valve spacing can be greater than about ten times the diameter of the conveyor conduit. Therefore, this apparatus has the disadvantage that a hundred such valves are required for a conveyor conduit which is 100 meters in length and which has a conduit diameter of 100 mm.

The basic concept of the present invention lies in separating the pressure measurement function and the air transfer function performed by the valves V, and for this purpose, shut-off members or valves are provided along the by-pass conduit, preferably at relatively large distances from each other, for example from ten up to about one hundred times the conduit diameter. These shut-off members shut off the by-pass conduit in the event of a pressure difference as mentioned above, from the by-pass conduit to the conveyor conduit. Between such shut-off members, the by-pass conduit and the conveyor conduit are connected at a plurality of positions by flow control or flow transfer valves which are simple in operation and which permit air to flow from the by-pass conduit N into the conveyor conduit F. Each section may include up to twenty flow transfer valves.

Referring now more specifically to FIG. 3, this arrangement is shown in diagrammatic form, together with gas pressure distribution before (upper part of FIG. 3) and after (lower part of FIG. 3) closure of a shut-off valve 1. The apparatus shown includes by way of example two shut-off valves 1 and 2, and a plurality of flow control valves (V in FIG. 1) denoted 3, 4 and 5, between the pair of valves 1 and 2. It will be appreciated that when at first a blockage S forms, only the valve 3 is involved in breaking up and eliminating the blockage. The air flowing through the valves 4 and 5 only becomes involved in removing the blockage, as a supporting action, when the blockage S is displaced or slides towards the right in the conveyor conduit F, as dissolution of the blockage S begins. For this reason not more than twenty flow transfer valves will be arranged between the valves 2 and 1. As the valves 1 and 2 do not permit air to flow into the conveyor conduit, it is important that they are arranged, between a respective pair of adjacent flow transfer valves, substantially at a distance of a/2 from each of such valves, wherein a is the distance between two such flow transfer valves.

The following factor should also be taken into account in determining the dimensions of the flow transfer valves as at 3, 4 and 5 and selecting the distances therebetween: if there is a blockage S between two pressure measuring positions, that is to say, between two shut-off valves 1 and 2 in the conveyor conduit, and such blockage, in the most unfavourable case, extends only between a flow transfer valve and the next upstream shut-off valve, then all the flow transfer valves disposed between the said two pressure measuring positions (valves 1 and 2) will cause air to flow from the by-pass conduit into the conveyor conduit; in this case it wil be evident that only the inflow of air which is introduced into the blockage will be appropriately employed to act thereon. If now the blockage affords a greater resistance to the inflow of air through the respective flow transfer valve which is intended to be operative to dissolve the blockage, than the other flow transfer valves which are disposed downstream of the blockage, then air will flow freely from the by-pass conduit into the downstream empty part of the conveyor conduit, by-passing the blockage and the flow transfer valve which is disposed in the region of the blockage. For this reason it is important that the resistance to displacement of a blockage which is disposed in a section between two flow transfer valves should be lower than the flow resistance afforded by the flow transfer valves which lie downstream of the blockage, between two adjacent shut-off valves as at 1 and 2.

The diagram shown in the upper part of FIG. 3 illustrates the pressure distribution in the respective conduits N and F when there is a blockage S. It will be seen that the pressure in the conduit F, as denoted by Fp, is higher than the pressure in the by-pass conduit N, as denoted by Np, upstream of the upstream end of the blockage S. However, the pressure distribution reverses this relationship downstream of the blockage S, resulting in a pressure difference as denoted by $\Delta p$. The pressure Np now being higher than the pressure Fp, will therefore cause the respective valves 3, 4 and 5 to open, to cause air flow from the by-pass conduit to the conveyor conduit.

When however a valve as at 1 is closed, then the pressure in the by-pass conduit N downstream of that valve drops abruptly away to zero, and this is the situation shown in the lower part of FIG. 3.

It will be seen therefore that the transfer of air or other compressed gas from the by-pass conduit into the conveyor conduit, in consequence of the pressure of the blockage S, is limited to the section defined by the valves 1 and 2. This therefore serves to reduce the amount of gas which can flow throughout the length of the by-pass conduit and from the by-pass conduit into the conveyor conduit.

Figure 4:
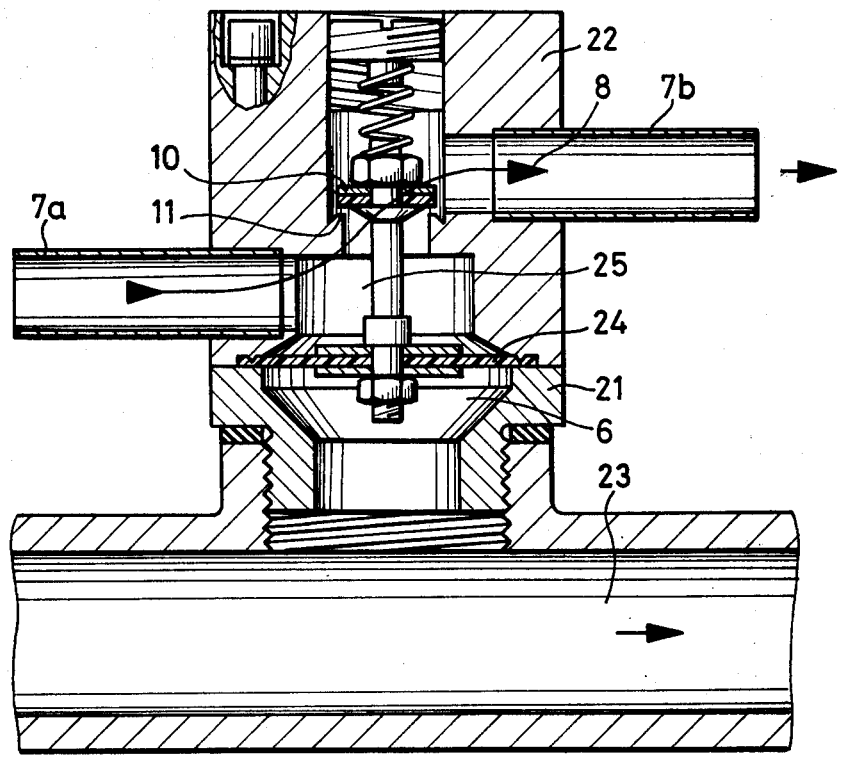
FIG. 4 shows an exemplary embodiment of a flow control or flow transfer valve of the apparatus of FIG. 3.

Reference will now be made to FIG. 4 which shows an embodiment of a shut-off valve as described above with reference to FIG. 3. The valve comprises first and second housing portions 21 and 22, of which the housing portion 21 is connected to conveyor conduit 23, and the second portion 22 is connected to by-pass conduit of which conduit portions 7a and 7b are illustrated. The housing portion 21 provides a chamber 6 which is in gas flow communication with the interior of the conduit 23 while the portion 22 provides a chamber 25 which is in gas flow communication directly with the conduit portion 7a. Reference will be made to the connection between the portion 22 and the other conduit portion 7b hereinafter.

The FIG. 4 valve also comprises a flexible diaphragm 24 connected by an operating stem to a seal or valve member 10 capable of air-tightly bearing against a valve seat 11. The valve member 10 is loaded towards the valve seat 11 by a spring (not referenced) which can be adjusted by a screwed plug.

It will be seen from FIG. 4 that the conduit portion 7b is in flow communication with the part of the interior of the portion 22, which is on the side of the valve seat 11 remote from the chamber 25. Thus, when the pressure prevailing in chambers 6 and 25 is substantially equal, the diaphragm 24 is in a neutral or rest position as shown. Air can then flow from the conduit portion 7a, beween the valve member 10 and the valve seat 11, and into the conduit portion 7b, in the direction indicated by arrow 8. If however the pressure prevailing within the conveyor conduit 23 is lower than the pressure prevailing in the by-pass conduit 7a and 7b, the pressure difference between the chambers 6 and 25 will cause the diaphram to be displaced in its central part downwardly in FIG. 4, whereby the valve member 10 will be pressed against the valve seat 11 to close the conduit portion 7b from the conduit portion 7a. This will thus seal the by-pass conduit downstream of the FIG. 4 valve, as described above with reference to FIG. 3.

We claim:

1. A method for the pneumatic conveying of bulk material comprising the steps of
   a. introducing a conveyor gas into a conveyor conduit;
   b. introducing material to be conveyed into the conveyor conduit for conveying by the conveyor gas;
   c. passing gas through a by-pass conduit which has communications with the conveyor at a plurality of spaced positions, the pressure distribution in the by-pass conduit being substantially adapted to the pressure distribution which occurs in normal operation in the conveyor conduit;
   d. positioning a plurality of shut-off means in spaced relation along said by-pass conduit thereby to divide said by-pass conduit into a series of sections each of which is between adjacent shut-off means, said shut-off means serving only to permit or shut off flow through said by-pass conduit and not serving to communicate flow between said by-pass conduit and said conveyor conduit;
   e. positioning a plurality of flow transfer valves in each section, each of said valves being adapted to permit the flow of gas from said by-pass conduit into said conveyor conduit when the pressure difference between the by-pass conduit and the conveyor conduit exceeds a preselected threshold value due to a pressure drop in the conveyor conduit downstream of a gas flowimpeding accumulation of material in the conveyor conduit,
   whereby gas is transferred from the by-pass conduit into the conveyor conduit simultaneously by way of all of said flow transfer valves in such sections which are disposed between said accumulation of material and the next following downstream shut-off means.

2. Apparatus for the pneumatic conveying of bulk material, comprising:
   a conveyor conduit; means for introducing conveyor gas into the conveyor conduit; means for introducing material to be conveyed into the conveyor conduit; a by-pass conduit; means for introducing gas into the by-pass conduit; a plurality of shut-off valve means on the by-pass conduit at spacings from each other along the length of the by-pass conduit whereby the by-pass conduit is divided into a plurality of sections, each said shut-off valve means being operable to close the by-pass conduit to delimit the respective sections in response to a predetermined pressure difference between the by-pass conduit and the conveyor conduit, the closing of a particular shut-off valve means preventing communication from said by-pass conduit to said conveyor conduit at the point of said particular shut-off valve means and downstream thereof; and a plurality of connecting means in each of said sections connecting the by-pass conduit and the conveyor conduit together at a plurality of positions spaced along the length of the respective section, each said connecting means including a flow transfer valve for the transfer of clean gas from the by-pass conduit into the conveyor conduit when the pressure in the respective section of said by-pass conduit is higher than the pressure in the corresponding portion of the conveyor conduit by a preselected amount, the flow transfer valves in all other sections remaining closed whereby gas is not transferred in such sections from said by-pass conduit to said conveyor conduit.

3. Apparatus according to claim 2 wherein the length of each said section is from ten to one hundred times the diameter of the conveyor conduit.

4. Apparatus according to claim 2 wherein each said section includes up to twenty of said flow transfer valves.

5. The apparatus of claim 2 wherein said shut-off means comprises a shut-off valve having a spring-biased valve seat which is unseated when said predetermined pressure difference is not reached thereby permitting flow along said by-pass conduit through said shut-off valve; a diaphragm mounted in said valve and operatively connected to said valve seat for moving the same, said diaphragm positively precluding passage of gas from said by-pass conduit to said conveyor conduit, the said pressure difference between said conduits as a result of said accumulation of material in said conveyor conduit causing displacement of said diaphragm thereby effecting simultaneous movement of said valve seat to a seated position shutting off gas flow through said shut-off valve until said pressure difference is obviated.

6. Apparatus for the pneumatic conveying of bulk material, including a conveyor conduit for carrying a conveyor gas and material to be conveyed thereby; a by-pass conduit for carrying a clean gas; a plurality of shut-off valves spaced along the by-pass conduit and operable to close the by-pass conduit and to thereby divide the by-pass conduit into sections separated from each other, said shut-off valves being responsive to a predetermined pressure difference between a low pressure in the conveyor conduit and a higher pressure in the by-pass conduit, the closing of a particular shut-off valve preventing communication from said by-pass conduit to said conveyor conduit at the point of said particular shut-off valve and downstream thereof; and a plurality of connecting means in each of said sections connecting the by-pass conduit and the conveyor conduit together at a plurality of positions spaced along the respective section, each said connecting means including a flow control valve for controlling the transfer of clean gas from the by-pass conduit into the conveyor conduit when the pressure in the conveyor conduit is lower by a preselected amount than the pressure in the respective section of the by-pass conduit, the flow control valves in all other sections remaining closed whereby gas is not transferred in such other sections from said by-pass conduit to said conveyor conduit.

* * * * *